United States Patent
Suzuki

(10) Patent No.: US 6,948,837 B2
(45) Date of Patent: Sep. 27, 2005

(54) PATTERN-VARIABLE HEADLAMP

(75) Inventor: Eiji Suzuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 32 days.

(21) Appl. No.: 10/793,330

(22) Filed: Mar. 5, 2004

(65) Prior Publication Data
US 2004/0228138 A1 Nov. 18, 2004

(30) Foreign Application Priority Data
Mar. 7, 2003 (JP) ......................................... 2003-062131

(51) Int. Cl.⁷ ............................. B60Q 1/00; B60Q 1/06; F21V 17/02
(52) U.S. Cl. ........................ 362/539; 362/512; 362/469
(58) Field of Search ............................. 315/82; 362/512, 362/539, 469, 509

(56) References Cited

U.S. PATENT DOCUMENTS

| | | | | |
|---|---|---|---|---|
| 5,315,442 | A | | 5/1994 | Sato et al. .................. 359/877 |
| 6,116,764 | A | | 9/2000 | Eichhorn et al. ........... 362/512 |
| 6,186,651 | B1 | * | 2/2001 | Sayers et al. ............... 362/512 |
| 6,623,149 | B2 | * | 9/2003 | Leleve ....................... 362/512 |
| 2002/0089853 | A1 | * | 7/2002 | Taniuchi et al. ............ 362/297 |
| 2003/0112635 | A1 | * | 6/2003 | Tatsukawa .................. 362/512 |
| 2003/0165066 | A1 | * | 9/2003 | Watanabe et al. ........... 362/523 |
| 2003/0235056 | A1 | * | 12/2003 | Jong ........................... 362/512 |
| 2005/0036333 | A1 | * | 2/2005 | Van Duyn ................... 362/539 |
| 2005/0063192 | A1 | * | 3/2005 | Tatara et al. ................ 362/512 |

FOREIGN PATENT DOCUMENTS

JP 9-330603 A 12/1997
JP 11-240385 A 9/1999

* cited by examiner

Primary Examiner—Wilson Lee
Assistant Examiner—Angela M Lie
(74) Attorney, Agent, or Firm—Foley & Lardner LLP

(57) ABSTRACT

A pattern-variable headlamp includes a light source, a reflector, a movable shade that switches a position between a first position, a second position, and a third position to form a first light distribution pattern, a second light distribution pattern, and a third light distribution pattern, respectively, from the light reflected from the reflector, a projection lens that irradiates the light distribution pattern to a road surface, a first solenoid that moves the movable shade to switch from the first position to the second position, a second solenoid that moves the movable shade to switch from the first position to the third position, and an elastic returning unit that returns the movable shade to switch from the second position to either of the first position and the third position, or from the third position to the first position.

8 Claims, 8 Drawing Sheets

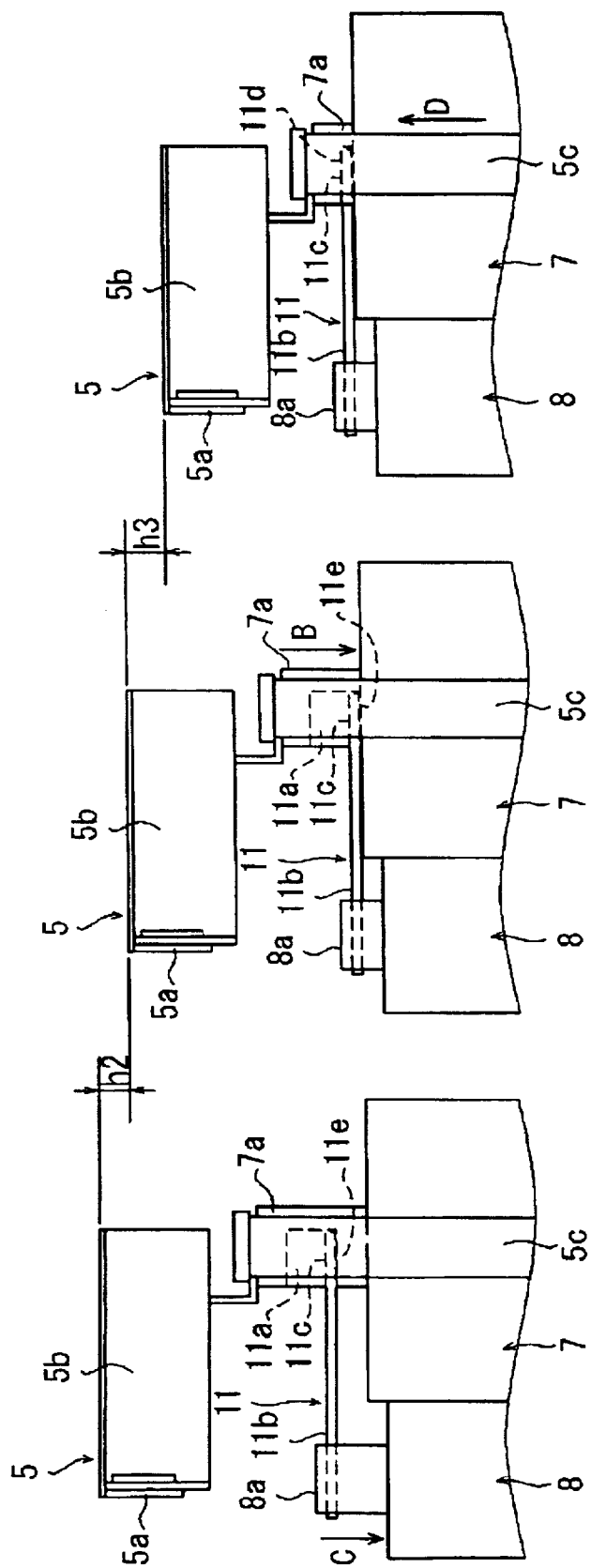

US 6,948,837 B2

PATTERN-VARIABLE HEADLAMP

CROSS-REFERENCE TO RELATED APPLICATIONS

The present document incorporates by reference the entire contents of Japanese priority document, 2003-62131 filed in Japan on Mar. 7, 2003.

BACKGROUND OF THE INVENTION

1) Field of the Invention

The present invention relates to a headlamp to obtain a plurality of different light distribution patterns with one light source by switching a position of a movable shade.

2) Description of the Related Art

A headlamp is disclosed in, for example, Japanese Patent Application Laid-Open No. H11-240385 and U.S. Pat. No. 5,315,442. In the former, two different light distribution patterns can be obtained with one light source by switching a position of a movable shade using one solenoid. In the latter, four different light distribution patterns can be obtained with one light source by switching a position of a movable shade using two direct-current (DC) motors or stepping motors.

However, the former headlamp has a problem that only two light distribution patterns can be obtained; the latter headlamp has a problem that a switching speed of the movable shade is slow because the two DC motors or stepping motors are used.

SUMMARY OF THE INVENTION

It is an object of the present invention to solve at least the problems in the conventional technology.

The pattern-variable headlamp according to one aspect of the present invention includes a light source, a reflector that reflects light from the light source, a movable shade that switches a position between a first position, a second position, and a third position to form a first-light distribution pattern, a second light distribution pattern, and a third light distribution pattern, respectively, from the light reflected from the reflector, a projection lens that irradiates the first light distribution pattern, the second light distribution pattern and the third light distribution pattern to a road surface, a first solenoid that moves the movable shade to switch from the first position to the second position, a second solenoid that moves the movable shade to switch from the first position to the third position, and an elastic returning unit that returns the movable shade to switch from the second position to either of the first position and the third, position, or from the third position to the first position.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6A is a partial side view of the movable shade located at a first position;

FIG. 6B is a partial side view of the movable shade located at a third position;

FIG. 6C is a partial side view of the movable shade located at a second position;

DETAILED DESCRIPTION

Exemplary embodiments of a headlamp according to the present invention will be described below in detail with reference to the accompanying drawings. The present invention is not limited to the embodiments, and the constituents in the embodiments include those that can easily be achieved by persons skilled in the art or are substantially the same.

The embodiment is of a headlamp for a vehicle of right-hand traffic, but the invention is not limited to this, and the invention can also be applied to a headlamp for a vehicle of left-hand traffic. In such a case, the configuration of the headlamp should be laterally reversed.

Figure 1:
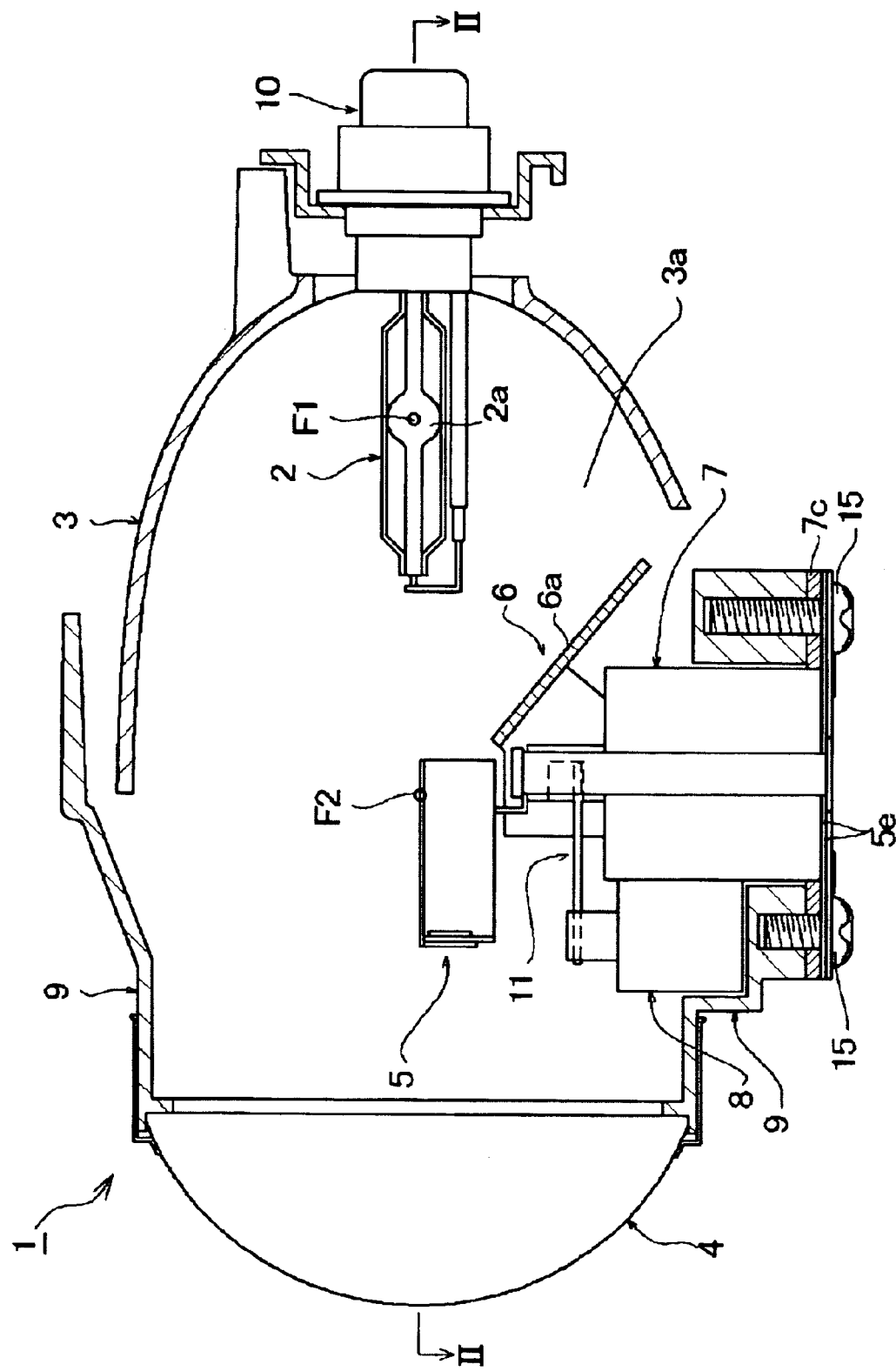
FIG. 1 is a schematic of a headlamp according to the present invention.
Figure 2:
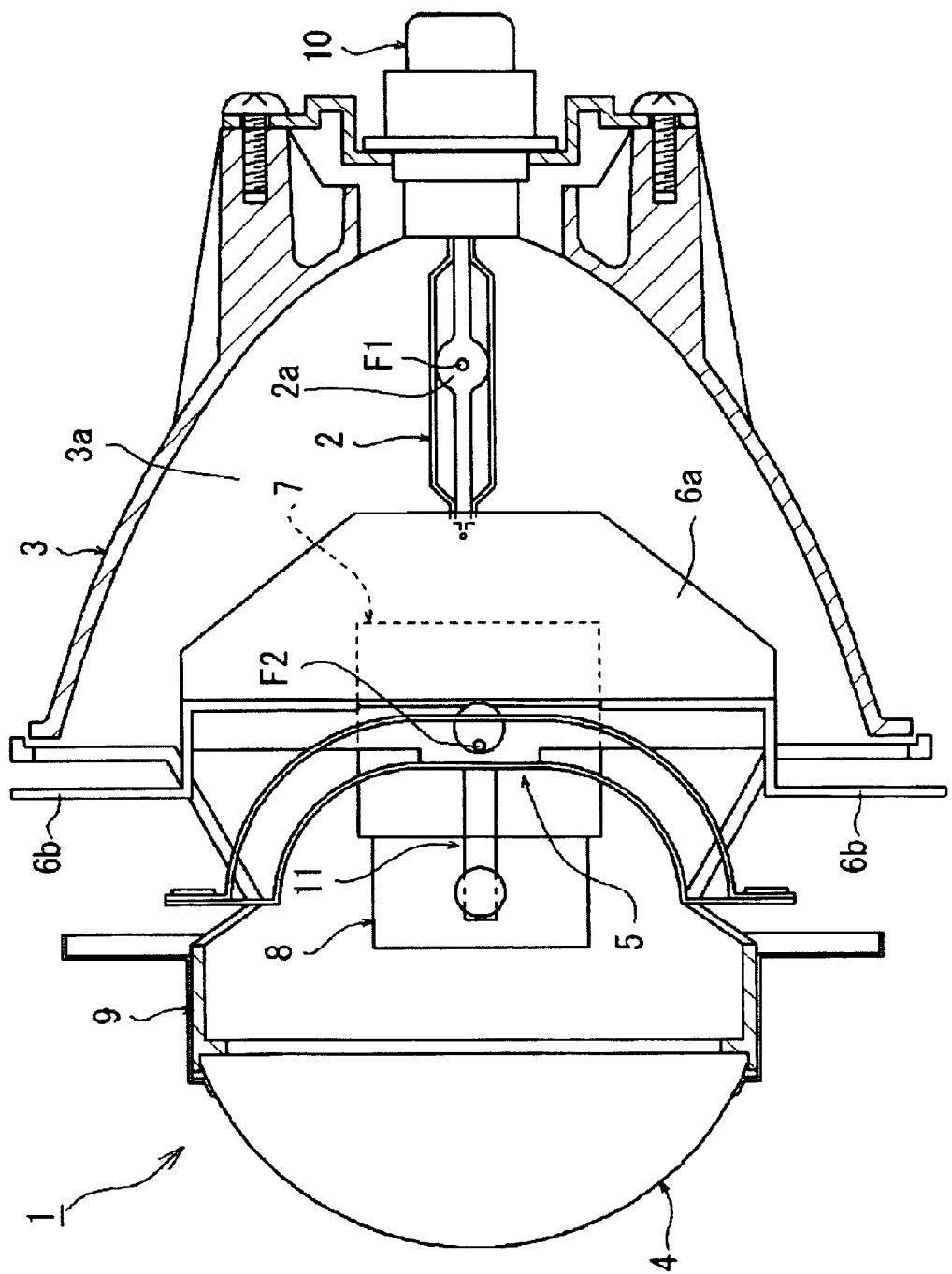
FIG. 2 is a cross unit of the headlamp, cut along a line II—II in FIG. 1.

FIG. 1 is a schematic of a headlamp according to the present invention; FIG. 2 is a cross unit of the headlamp, cut along a line II—II in FIG. A headlamp 1 is of a two-lamp projector type. It also includes at least a light source 2, a reflector 3, a projection lens (condensing lens) 4, a movable shade 5, a fixed shade 6, a first solenoid 7, and a second solenoid 8. A sign 9 represents a holder (frame or housing) which fixes and holds the reflector 3, the projection lens 4, and the like.

The light source 2 is a discharge lamp such as a high pressure metal vapor discharge lamp and a high intensity discharge (HID) lamp such as a metal hydride lamp. The light source 2 is detachably mounted on the reflector 3 through a socket mechanism 10. The light source 2 is disposed on a predetermined location with respect to the reflector 3 by mounting the light source 2 on the reflector 3. A connector (not shown) of the socket mechanism 10 is detachably connected to the light source 2. The connector supplies a power from a ballast (not shown) to the light source 2. The ballast supplies high voltage required for starting the discharge lamp or the light source 2, and supplies stable voltage when the discharge lamp comes ON. A light-emitting unit 2a of the light source 2 is located near a first focus F1 of the reflector 3.

The reflector 3 has aluminum-evaporated or silver-coated inner concave surface as a reflection surface. This reflection surface is basically a rotating elliptical surface. The reflection surface includes the first focus F1 and a second focus F2. The reflector 3 is fixed and held by the holder 9 through an optical axis adjusting unit (not shown).

Although it is not shown in the drawing, the projection lens 4 has a focal plane (meridional image surface) on the side of an object space near the second focus F2 of the reflector 3 and forward of the second focus F2 (a forward direction of the vehicle and light-emitting direction of the headlamp 1).

The movable shade 5 is a thin steel plate such as a Special Use Stainless Steel (SUS). The movable shade 5 includes two movable shade bodies 5a and 5b, a leaf spring 5c which is an elastic returning unit, a first fixing unit 5d for mounting the two movable shade bodies 5a and 5b on a first plunger 7a of the first solenoid 7, and a second fixing unit 5e which allows a holder 9 to fix and hold the leaf spring 5c. As illustrated in FIG. 2, central portion of the two movable shade bodies 5a and 5b are curved toward the light source 2 in a convex manner as viewed from above. Each of the two movable shade bodies 5a and 5b vertically moves and switches to any of a first position (low-beam position), a third position (motorway position), and a second position (high-beam position) by the first solenoid 7, the second solenoid 8, and the leaf spring 5c. The front movable shade body 5a is integrally formed on the first fixing unit 5d. An edge 5f is provided on an upper edge of a central portion of the front movable shade body 5a. The front movable shade body 5a is provided at its opposite ends with fixing holes 5g through which the rear movable shade body 5b is fixed to the movable shade body 5a. An edge 5h is also provided on an upper edge of a central portion of the rear movable shade body 5b. The rear movable shade body 5b is provided at its opposite ends with fixing holes 5i through which the front movable shade body 5a is fixed to the movable shade body 5b. Substantially intermediate portions of the edges 5f and 5h of the two movable shade bodies 5a and 5b are formed with steps which are inclined at an angle of 45 degrees (or 30 degrees).

The leaf spring 5c as the elastic returning unit is formed into a band-like shape, and is integrally provided between the first fixing unit 5d and the two second fixing units 5e. A central portion of the leaf spring 5c is curved such that the central portion is convex laterally as viewed from front (front of the headlamp 1) when the headlamp is assembled. As a result, the leaf spring 5c is curved when the movable shade 5 is assembled and thus, a returning force, that is, elastic force is generated. This elastic returning force acts in a direction vertically pushing and spreading the first fixing unit 5d and the two second fixing units 5e as illustrated by a solid arrow in FIG. 3.

The first fixing unit 5d is provided at its central portion with a mounting hole 5j for fixing the movable shade 5 to the first plunger 7a of the first solenoid 7. Each of the two second fixing units 5e is provided with fixing holes 5k (two in FIG. 3) for fixing the two second fixing units 5e to each other and with mounting holes 5l (two in FIG. 3) for fixing the leaf spring 5c and the holder 9 to each other.

The fixed shade 6 is a thin steel plate such as SUS, and includes a shade unit 6a and a mounting unit 6b which are integrally formed together. The shade unit 6a projects from a central portion of the mounting unit 6b rearward (toward the light source 2). The fixed shade 6 is fixed and held by mounting a mounting unit 6b on the holder 9 by a screw or the like (not shown). At that time, the shade unit 6a is disposed at a position lower than the light source 2 in a space 3a formed in the reflector 3. The shade unit 6a has a function of shielding reflection light from the reflector 3, a function of protecting the first solenoid 7 and the second solenoid 8 from radiation heat from the light source 2, and a stopper function of allowing the two movable shade bodies 5a and 5b to, stay at the first position. A thickness of the thin steel plate constituting the fixed shade 6 is thicker than a thin steel plate constituting the movable shade 5.

Figure 3:
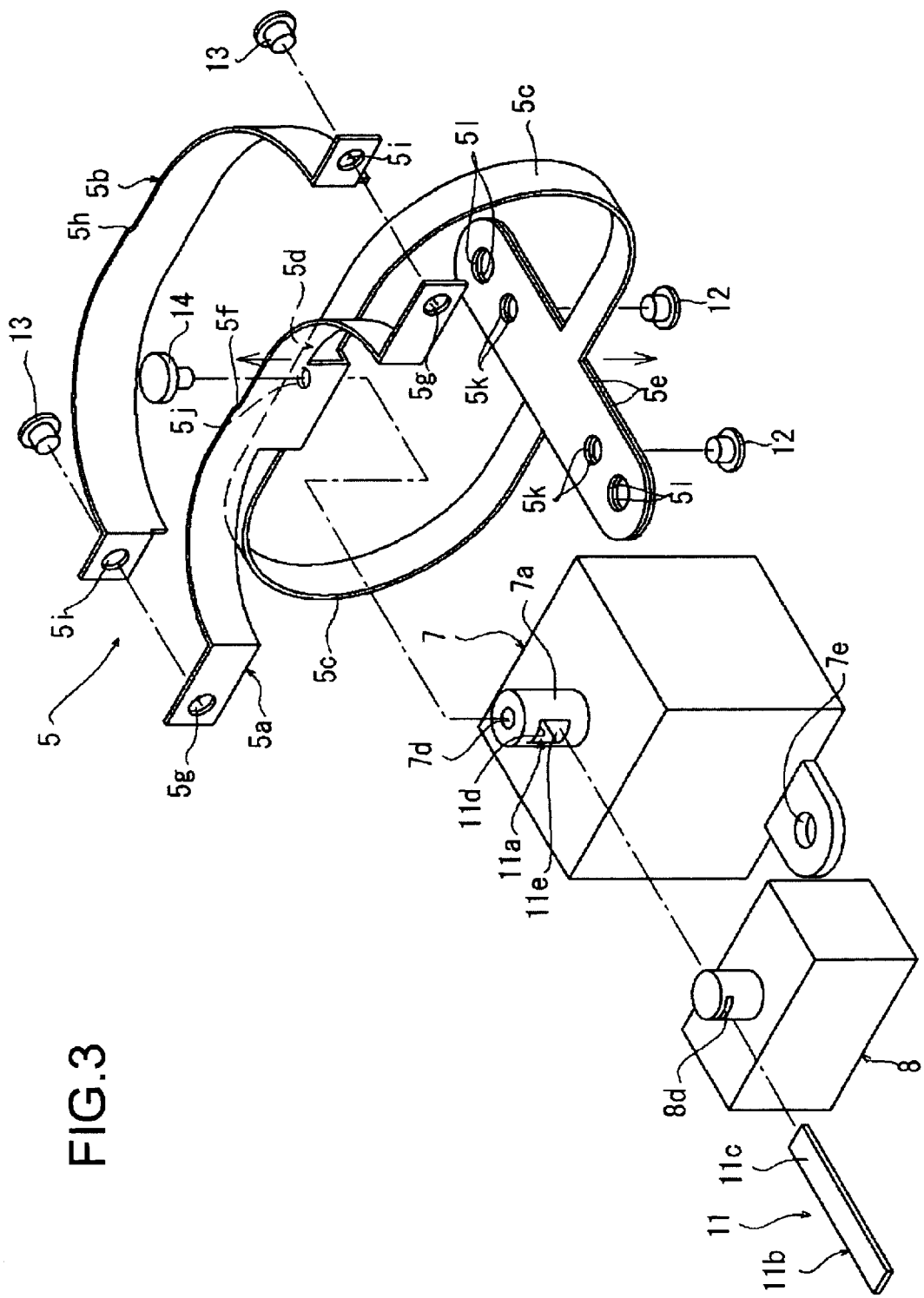
FIG. 3 is an exploded view of a movable shade, a first solenoid, and a second solenoid.
Figure 4:
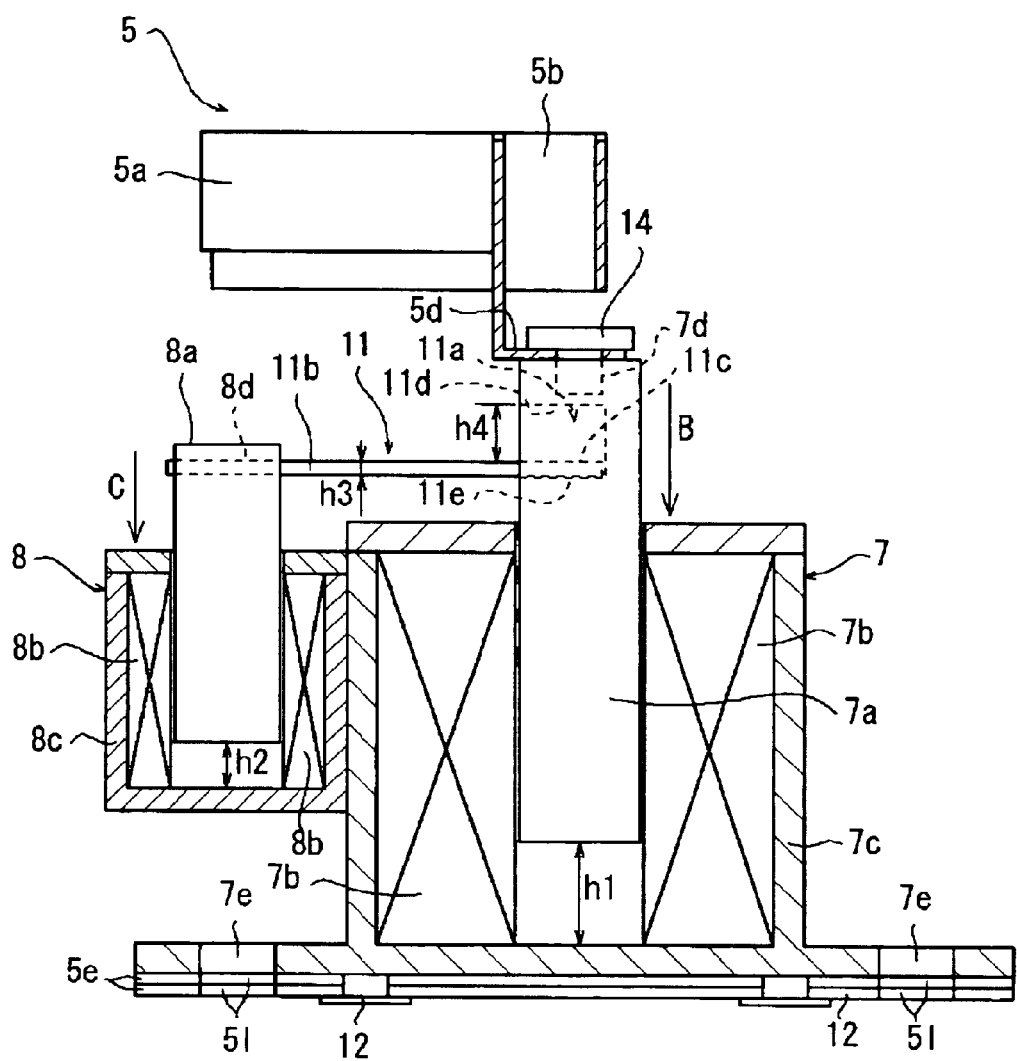
FIG. 4 is a cross unit of the first solenoid and the second solenoid.

The first solenoid 7 is a pull-type solenoid, and includes a cylindrical first plunger 7a, a coil 7b, and a solenoid yoke 7c as illustrated in FIG. 3 and FIG. 4. An end surface of a tip end of the first plunger 7a is provided with a mounting hole 7d to which a first fixing unit 5d of the movable shade 5 is mounted. The tip end of the first plunger 7a is provided with a trench 11a in a moving direction (switching direction) of the movable shade 5. The trench 11a abuts against the other end of a connecting plate 11b of a connecting mechanism 11 described later. The coil 7b is provided in the solenoid yoke 7c such as to surround the first plunger 7a. When the coil 7b of the first solenoid 7 is energized, a magnetic force is generated in the coil 7b, and the first plunger 7a is attracted in a direction of arrow B and is moved. A stroke amount h1 of the first plunger 7a at that time is set to such a length that the movable shade 5 can move from the first position to the second position. The first solenoid 7 is mounted on the holder 9 together with the movable shade 5 by a fixing hole 7e formed in the solenoid yoke 7c.

The second solenoid 8 is a pull-type solenoid, and includes a cylindrical second plunger 8a, a coil 8b, and a solenoid yoke 8c. A connecting plate hole 8d is provided near a tip end of the second plunger 8a. One end of the connecting plate 11b of the connecting mechanism 11 is inserted into the connecting plate hole 8d and is fixed therein. The coil 8b is provided in the solenoid yoke 8c such as to surround the second plunger 8a. When the coil 8b of the second solenoid 8 is energized, a magnetic force is generated in the coil 8b and the second plunger 8a is attracted in a direction of arrow C and is moved. A stroke amount h2 of the second plunger 8a at that time is set to such a length that the movable shade 5 can move from the first position to the third position. The second solenoid 8 is fixed to and held by the first solenoid 7 by a fixing unit (not shown) such as a screw or welding. That is, the first solenoid 7 and the second solenoid 8 are disposed side-by-side, and a center line of the first plunger 7a of the first solenoid 7 and a center line of the second plunger 8a of the second solenoid 8 are substantially in parallel to each other. FIG. 4 is a cross unit of the first solenoid and the second solenoid. H1 to h4 may be different from actual values.

The first plunger 7a of the first solenoid 7 and the second plunger 8a of the second solenoid 8 are connected to each other through the connecting mechanism 11. The connecting mechanism 11 includes a connecting plate 11b. One end of the connecting plate 11b is inserted into the connecting plate hole 8d of the second plunger 8a and fixed therein, and the other end of the connecting plate 11b abuts against one of the end surfaces 11d and 11e of the trench 11a of the first plunger 7a, thereby switching the movable shade 5.

A length of the connecting plate 11b is set such that when the second solenoid 8 is fixed to the first solenoid 7, one end of the connecting plate 11b is inserted into the connecting plate hole 8d of the second plunger 8a and fixed therein and the other end 11c of the connecting plate 11b is located in the trench 11a of the first plunger 7a. That is, the length of the connecting plate 11b bis such a value that the one end 11c of the connecting plate 11b can abut against the end surface 11d or 11e in the moving direction of the first plunger 7a which forms the trench 11a.

The connecting plate 11b is made of metal or the like. It is preferable that a thickness h3 of the connecting plate 11b is such a value that when the first solenoid 7 is moved by the second solenoid 8 through the connecting mechanism 11, the connecting plate 11b is not bent. A length h4 obtained by subtracting the thickness h3 of the connecting plate 11b from a height of the trench 11a is such a value that the movable shade 5 can move from the third position to the second position. That is, h4 is set such that a sum length of h2 and h4 is equal to a length of h1.

Figure 5:
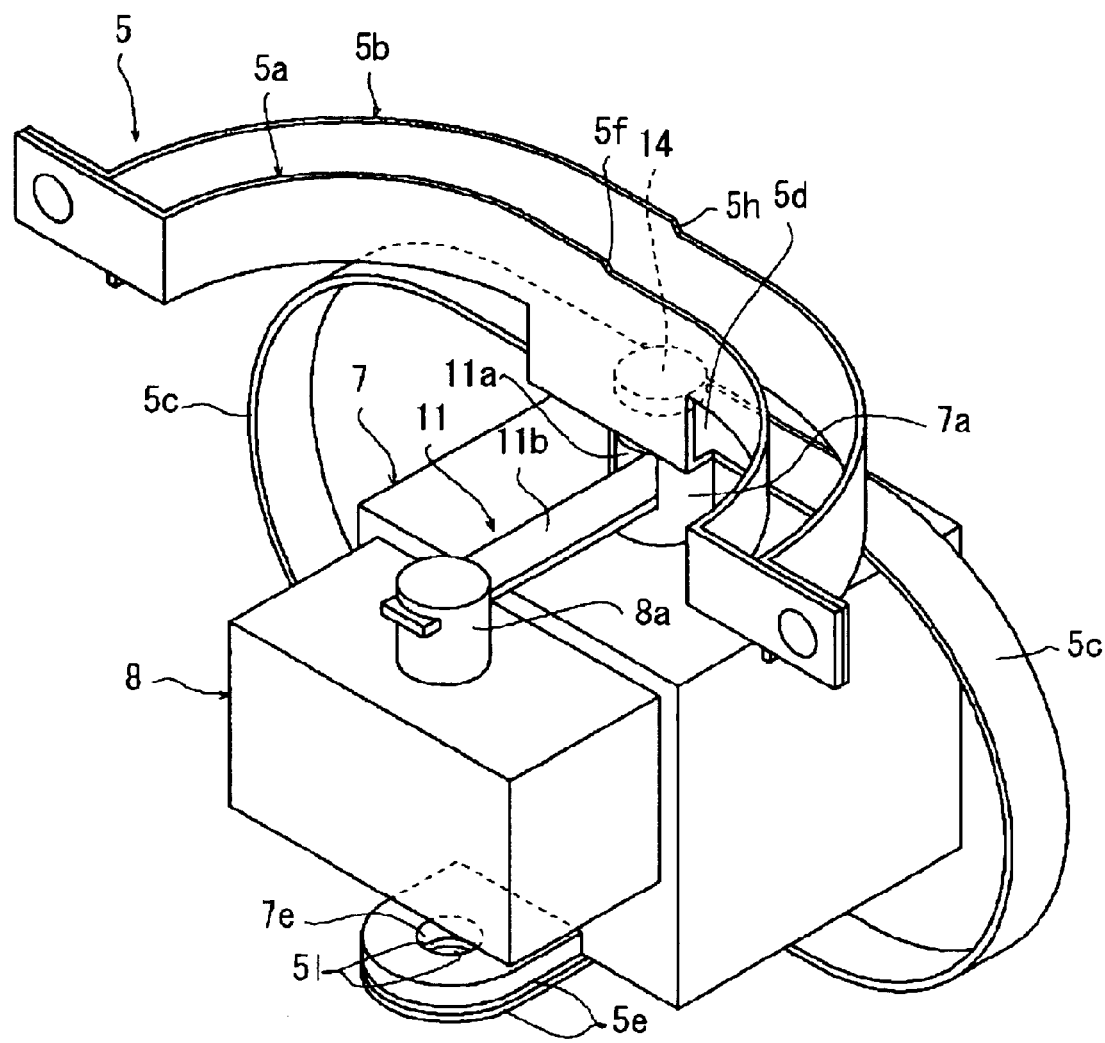
FIG. 5 is an assembly diagram of the movable shade, the first solenoid, and the second solenoid.

The assembling manner of the movable shade 5, the first solenoid 7, and the second solenoid 8 will be explained with-reference to FIG. 3 and FIG. 5. First, rivets 12 are inserted into the fixing holes 5k of the two second fixing units 5e of the movable shade 5, and the rivets 12 are fastened on a back surface (upper surface of the second fixing unit 5e in FIG. 3) of one of the second fixing units 5e thereby fixing the second fixing units 5e. Next, the two fixing holes 5i of the rear movable shade body 5b are superposed on the two fixing holes 5g of the front movable shade body 5a of the movable shade 5, rivets 13 are inserted into the superposed fixing holes 5g and 5i, and the rivets 13 are fastened on front surface (left surface of the front movable shade body 5a in FIG. 3) of opposite ends of the front movable shade body 5a. The fixing units of the two second fixing units 5e and the two movable shade bodies 5a and 5b are not limited to the rivets 12 and 13, and they may be fixed by caulking or spot welding:

Next, the second solenoid 8 is fixed to the first solenoid 7, and the connecting plate 11b of the connecting mechanism 11 is inserted into the connecting plate hole 8d of the second plunger 8a from opposite side where the first plunger 7a is located. At that time, the connecting plate 11b is inserted into the connecting plate hole 8d until the one end 11c of the connecting plate 11b comes into the trench 11a of the first plunger 7a. The connecting plate 11b inserted into the connecting plate hole 8d is fixed to and held by the second plunger 8a by a fixing unit (not shown). An end surface of the tip end of the second plunger 8a may be provided with a screw hole as this fixing unit (not shown) which is in communication with the connecting plate hole 8d, a bolt is threadedly inserted into this screw hole, and the connecting plate 11b in the connecting plate hole 8d may be fixed to and held by the second plunger 8a.

Next, the assembled first solenoid 7 and second solenoid 8 are disposed between the first fixing unit 5d and the two second fixing units 5e of the movable shade 5. A bolt 14 is inserted into the mounting hole 5j of the first fixing unit 5d, and if the bolt 14 is threadedly inserted into the mounting hole 7d of the first plunger 7a, the first fixing unit 5d of the movable shade 5 and the first plunger 7a, that is, the movable shade 5 can be fixed to the first solenoid 7. The movable shade 5, the first solenoid 7, and the second solenoid 8 are fixed by the holder 9 by the screw 15 through the mounting hole 5l of the second fixing units 5e of the movable shade 5 and the fixing hole 7e of the first solenoid 7. With the above operation, the assembling of the movable shade 5, the first solenoid 7, and the second solenoid 8 is completed as illustrated in FIG. 5. At that time, the leaf spring 5c as the elastic returning unit which is integral with the movable shade 5 is disposed while avoiding the first solenoid 7 and the second solenoid 8.

After the assembling is completed, when the first solenoid 7 and the second solenoid 8 are not energized, the first plunger 7a and the second plunger 8a are free. Since the second fixing units 5e are fixed to the holder 9, the first fixing unit 5d is biased upward by elastic force of the two leaf springs 5c together with the two movable shade bodies 5a and 5b, the first plunger 7a, the connecting plate 11b, and the second plunger 8a. The upward biasing motions of the first fixing unit 5d, the two movable shade bodies 5a and 5b, the first plunger 7a, the connecting plate 11b, and the second plunger 8a are limited by the stopper function of the shade unit 6a.

As a result, the two movable shade bodies 5a and 5b are located in the first position. The edges 5f and 5h of the two movable shade bodies 5a and 5b of the movable shade 5 are disposed near the second focus F2 by the elastic force of the two leaf springs 5c. The one end 11c of the connecting plate 11b of the connecting mechanism 11 abuts against one end surface 11e of the trench 11a of the first plunger 7a (the lower end surface lie closer to a direction in which the movable shade 5 is switched from the first position to the second position or the third position). The first plunger 7a has a gap corresponding to a length h1 between the lower end surface of the first plunger 7a and an upper surface of a bottom of the solenoid yoke 7c. The second plunger 8a has a gap corresponding to a length h2 between the lower end surface of the second plunger 8a and an upper surface of a bottom of the solenoid yoke 8c.

Figure 7A:
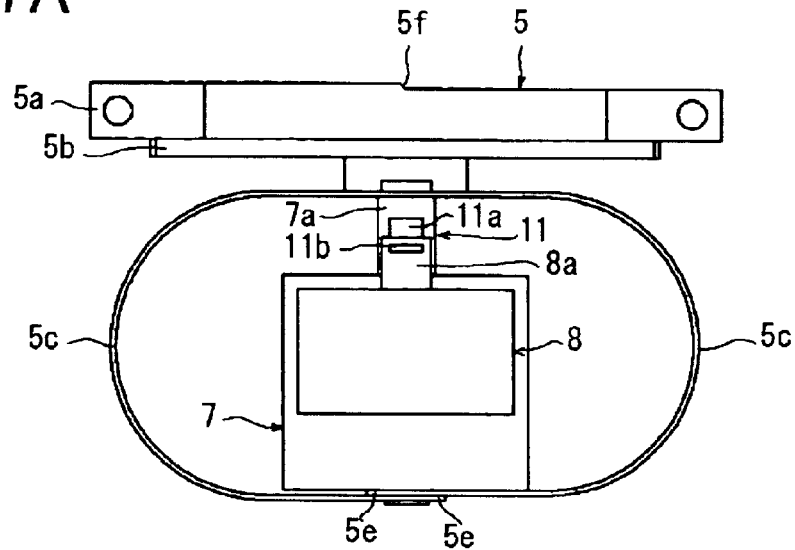
FIG. 7A is a front view of the movable shade located at the first position.
Figure 7B:
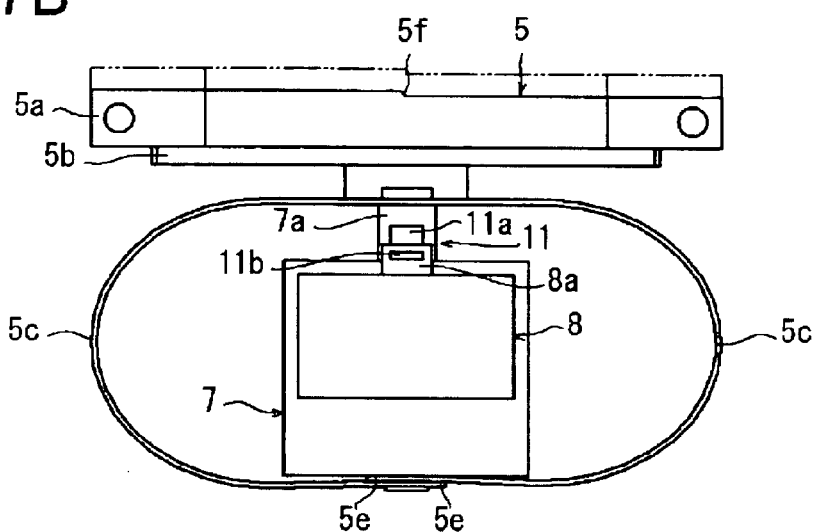
FIG. 7B is a front view of the movable shade located at the third position.
Figure 7C:
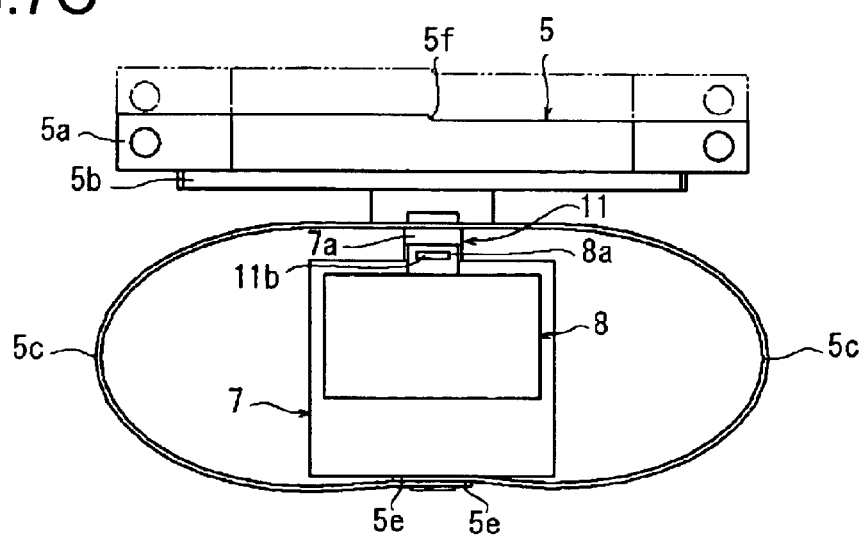
FIG. 7C is a front view of the movable shade located at the second position.
Figure 8A:
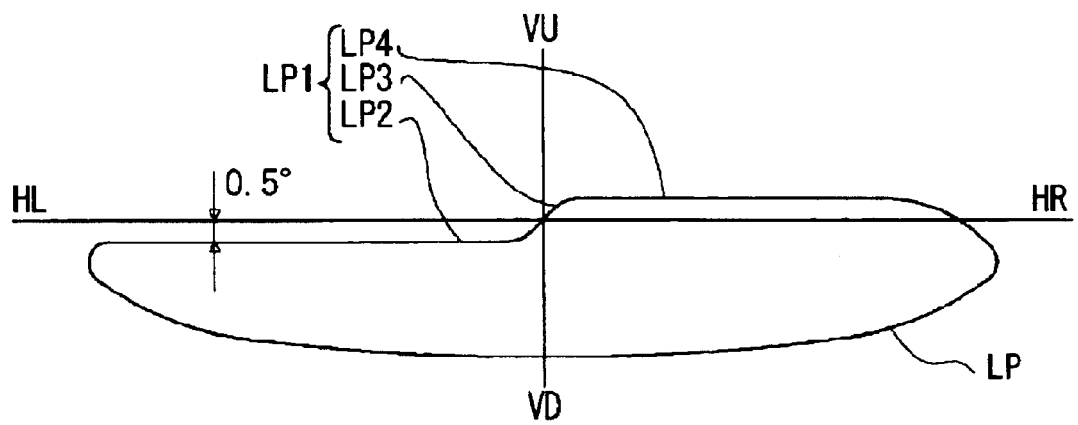
FIG. 8A is a schematic of a low-beam light distribution pattern.
Figure 8B:
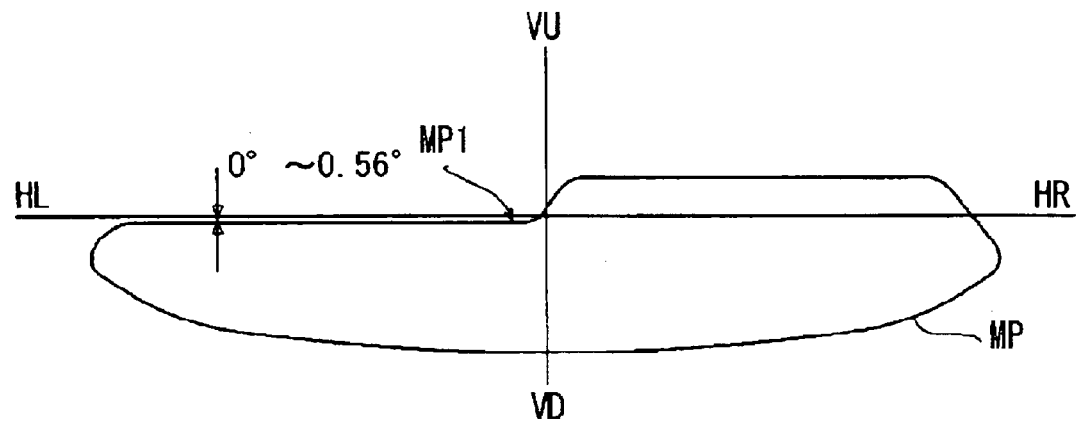
FIG. 8B is a schematic of a motorway light distribution pattern.
Figure 8C:
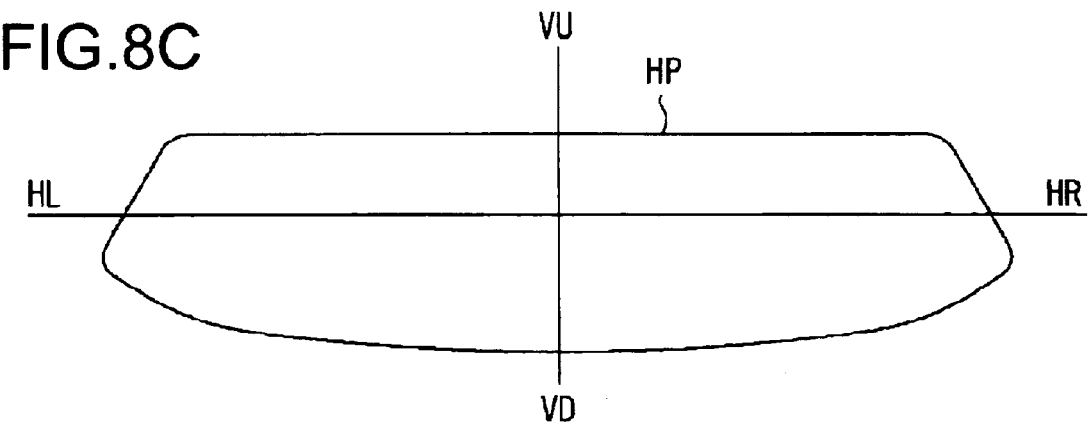
FIG. 8C is a schematic of a high-beam light distribution pattern.

Light distribution patterns illustrated in FIG. 8A, FIG. 8B, and FIG. 8C are projected on a screen located forwardly away from the headlamp 1 by 1 meter to 25 meters. The HL-HR indicates a lateral horizontal line of the screen, and the VU-VD indicates a vertical line of the screen. FIG. 6A to FIG. 7C are schematics for illustrating operation of the headlamp 1. H2 and h3 may be different from actual lengths.

When the coil 7b of the first solenoid 7 and the coil 8b of the second solenoid 8 are not energized, the two movable shade bodies 5a and 5b are located in the first position as illustrated in FIG. 6A and FIG. 7A by the elastic forces of the two leaf springs 5c and the stopper function of the shade unit 6a, and they are not deviated from the first position by vibration of the vehicle. The light source 2 comes ON by supplying electricity to the ballast (not shown). Light from the light source 2 staying illuminated is reflected by the reflector 3. At that time, a portion of the reflection light from the reflector 3 is shielded by the shade unit 6a of the fixed shade 6.

Remaining reflection light from the reflector 3 passes near the second focus F2. A portion of the reflection light passing near the second focus F2 is shielded by the two movable shade bodies 5a and 5b. Reflection light which is not shielded by the two movable shade bodies 5a and 5b is emitted outside of the headlamp 1 through the projection lens 4. By the reflection light emitted outside of the headlamp 1, a predetermined low-beam light distribution pattern LP (first light distribution pattern) as illustrated in FIG. 8A can be obtained. The low-beam light distribution pattern LP includes a terminator LP1 for limiting dizzy light. This LP1 includes a horizontal line portion LP2 which does not give dizzy light to an oncoming car, a horizontal line portion LP4 which does not give dizzy light to the oncoming car and which allows a driver to visually identify a road shoulder pedestrian, and a gently inclining portion LP3 connecting the LP2 and LP3 to each other. The terminator LP1 is formed by shielding reflection light from the reflector 3 by the edges 5f and 5h of the two movable shade bodies 5a and 5b. The horizontal line portion LP2 is inclined downward at an angle of about 0.5° with respect to the lateral horizontal line (HL-HR) of the screen.

Next, the coil 8b of the second solenoid 8 is energized, by which the second plunger 8a starts moving in the direction of arrow C by a magnetic force generated from the coil 8b as illustrated in FIG. 6B and FIG. 7B. That is, an attraction force for attracting the second plunger 8a is generated in the second solenoid 8, and this attraction force is stronger than the elastic force of the leaf spring 5c of the movable shade 5 and the second plunger 8a moves in the direction of arrow C. When this second plunger 8a moves in the direction of arrow C, the connecting plate 11b of the connecting mechanism 11 also moves in the direction of arrow C. At that time, since the coil 7b of the first solenoid 7 is not energized, the connecting plate 11b which is in abutment against the lower end surface 11e of the trench 11a of the first plunger 7a moves in the direction of arrow C, and the first plunger 7a also moves in the direction of arrow C.

If the second plunger 8a of the second solenoid 8 moves (strokes) to the terminal end, that is, until a lower surface of the second plunger 8a abuts against the upper surface of the bottom of the solenoid yoke 8c, the two movable shade bodies 5a and 5b are moved and switched to the third position. Since the stroke amount of the second plunger 8a is h2, the two movable shade bodies 5a and 5b move to the third position which corresponds to h2 from the first position. If the two movable shade bodies 5a and 5b move to the third position, since the stroke amount of the second plunger 8a becomes maximum, the two movable shade bodies 5a and 5b can not further move in the direction of arrow C from the positions illustrated in FIG. 6B and FIG. 7B depending on the attraction force of the second solenoid 8.

Since the coil 7b of the first solenoid 7 is not energized, the attraction force or holding force is not generated in the first solenoid 7. The attraction force of the second solenoid 8 exhibited when the two movable shade bodies 5a and 5b move to the third position is greater than the elastic force of the leaf spring 5c of the movable shade 5. Therefore, the two movable shade bodies 5a and 5b can stop at the third position by keeping the energization of the coil 8b of the second solenoid 8.

The light source 2 comes ON by supplying the electricity to the ballast (not shown). Light from the illuminated light source 2 is reflected by the reflector 3. At that time, a portion of the reflection light from the reflector 3 is shielded by the shade unit 6a of the fixed shade 6. Remaining reflection light from the reflector 3 passes near the second focus F2. A portion of the reflection light passing near the second focus F2 is shielded by the two movable shade bodies 5a and 5b which stop in the third position. Reflection light that is not shielded by the two movable shade bodies 5a and 5b is emitted outside of the headlamp 1 through the projection lens 4. By the reflection light emitted outside of the headlamp 1, a predetermined motorway light distribution pattern MP (third light distribution pattern) as illustrated in FIG. 8B can be obtained.

The light distribution pattern MP includes a terminator MP1. A configuration of the terminator MP1 is the same as that of the terminator LP1 of the low-beam light distribution pattern LP. The terminator MP1 is different from the terminator LP1 in that the terminator MP1 is located higher than the terminator LP1, that is, higher than HL-HR. With this configuration, the light distribution pattern MP can limit, to some extent, dizzy light with respect to a driver of an oncoming car while enhancing the visibility of a driver of a vehicle at the time of high speed traveling. A portion of the terminator MP1 corresponding to the horizontal line portion LP2 of the terminator LP1 is inclined in a range of about 0.56 degree downward to 0 degree with respect to the lateral horizontal line (HL-HR) of the screen.

When the coil 7b of the first solenoid 7 is energized, the first plunger 7a moves in a direction of arrow B by a magnetic force generated from the coil 7b as illustrated in FIG. 6B. That is, attraction force for attracting the first plunger 7a is generated in the first solenoid 7, and the movable shade 5 mounted on the first plunger 7a starts moving further downward in the direction of arrow B from the states illustrated in FIG. 6B and FIG. 7B. The leaf spring 5c provided between the first fixing unit 5d of the movable shade 5 and the two second fixing units 5e is further bent and the elastic force is further increased. Since the second plunger 8a of the second solenoid 8 is located at a terminal end of the stroke, the connecting plate 11b of the connecting mechanism 11 is not moved downward from the position illustrated in FIG. 6B.

Thus, if the first plunger 7a starts moving in the direction of arrow B, the one end 11c of the connecting plate 11b is separated from the lower end surface 11e of the trench 11a and moves in the trench 11a. With this, the attraction force and holding force generated in the second solenoid 8 do not affect the attraction force of the first solenoid 7 when the movable shade 5 moves from the third position to the second position, that is, the high-beam position.

If the first plunger 7a of the first solenoid 7 moves (strokes) to the terminal end, that is, until a lower surface of the first plunger 7a abuts against the upper surface of the bottom of the solenoid yoke 7c, the two movable shade bodies 5a and 5b are moved and switched to the second position. Since the stroke amount of the first plunger 7a is h1 (h1=h2+h4), the one end 11c of the connecting plate 11b of the connecting mechanism 11 abuts against the upper end surface lid of the trench 11a. If the two movable shade bodies 5a and 5b move to the second position, since the stroke amount of the first plunger 7a becomes maximum, the movable shade 5 can not further move in the direction of arrow B from the positions illustrated in FIG. 6C and FIG. 7C depending on the attraction force of the first solenoid 7.

Since the one end 11c of the connecting plate 11b abuts against the upper end surface 11d of the trench 11a in a state in which the stroke amount of the second plunger 8a is maximum, the movable shade 5 can not further move in the direction of arrow B. The attraction force of the first solenoid 7 exhibited when the two movable shade bodies 5a and 5b move to the second position is greater than the elastic force of the leaf spring 5c of the movable shade 5. Therefore, the two movable shade bodies 5a and 5b can stop at the second position by keeping the energization of the coil 7b of the first solenoid 7.

The light source 2 comes ON by supplying the electricity to the ballast (not shown). Light from the illuminated light source 2 is reflected by the reflector 3. At that time, a portion of the reflection light from the reflector 3 is shielded by the shade unit 6a of the fixed shade 6. Remaining reflection light from the reflector 3 passes near the second focus F2. A slight portion of the reflection light passing near the second focus F2 is shielded by the two movable shade bodies 5a and 5b which stop in the third position. Most of reflection light which is not shielded by the two movable shade bodies 5a and 5b is emitted outside of the headlamp 1 through-the projection lens. By the reflection light emitted outside of the headlamp 1, a predetermined high-beam light distribution pattern HP as illustrated in FIG. 8C can be obtained. In this light distribution pattern HP, a maximum luminous intensity value and a maximum luminous intensity band are taken into consideration, and this light distribution pattern is suitable when the number of oncoming cars is small at the time of high speed traveling.

When the two movable shade bodies 5a and 5b stop at the second position, the leaf springs 5c of the movable shade 5 are most bent as illustrated in FIG. 7C. In this state, if the energization of the coil 7b of the first solenoid 7 is stopped, the movable shade 5 tries to return to the third position or the first position in the direction of arrow D as illustrated in FIG. 6C by the elastic force of the leaf springs 5c. At that time, the one end of the connecting plate 11b which is in abutment against the upper end surface 11d of the trench 11a of the first plunger 7a again abuts against the lower end surface 11e illustrated in FIG. 6B because the first plunger 7a upwardly moves in the direction of arrow D.

If the coil 8b of the second solenoid 8 is kept energized, the holding force is generated in the second solenoid 8. Since this holding force is stronger than the elastic force of the leaf springs 5c, the two movable shade bodies 5a and 5b return to the third position from the second position and stop at the intermediate position.

If the energization of the coil 8b of the second solenoid 8 is stopped in the state in which the two movable shade bodies 5a and 5b return to the third position and stop, as illustrated in FIG. 7B, since the leaf springs 5c of the movable shade 5 are still bent, the first plunger 7a and thus the movable shade 5 tries to further return to the first position by the elastic force of the leaf springs 5c. At that time, since the attraction force and holding force are not generated in the second solenoid 8, the two movable shade bodies 5a and 5b can return to the first position. When the two movable shade bodies 5a and 5b mounted on the first plunger 7a are moved from the third position to the first position by the elastic force of the leaf springs 5c which are elastic units, since the one end 11c of the connecting plate 11b remains in abutment against the lower end surface 11e of the trench 11a, the second plunger 8a also moves (strokes) from the terminal end to the start end.

In the explanation of operation of the headlamp 1, the two movable shade bodies 5a and 5b are moved from the first position to the third position and from the third position to the second position. Alternatively, by energizing the coil 7b of the first solenoid 7 in a state in which the two movable shade bodies 5a and 5b stop at the first position, the two movable shade bodies 5a and 5b may be allowed to move directly to the second position without stopping at the third position. In the explanation of operation of the headlamp 1 in the embodiment, the two movable shade bodies 5a and 5b returned from the second position to the third position and from the third position to the first position. Alternatively, by stopping the energization of the coil 7b of the first solenoid 7 while by not previously energizing the coil 8b of the second solenoid 8 or by stopping the energization of the coil 8b in the state in which the two movable shade bodies 5a and 5b stop at the second position, the two movable shade bodies 5a and 5b may be returned to the first position directly.

According to the present embodiment, three different light distribution patterns can be obtained from a single light source with a high switching speed.

According to the present embodiment, the light distribution pattern can reliably and swiftly be switched.

According to the present embodiment, a required space can be reduced.

According to the present embodiment, assembling time of the headlamp and its production cost can further be reduced.

According to the present embodiment, it is possible to reduce an abutment noise between parts of the headlamp.

In the present embodiment, the length h4 obtained by subtracting the thickness h3 of the connecting plate 11b from the height of the trench 11a is set longer than the stroke amount h2 of the second plunger 8a. The present invention is not limited to this configuration. For example, h2 and h4 may be the same, and a distance through which the two movable shade bodies 5a and 5b move from the first position to the third position and a distance through which the bodies 5a and 5b move from the third position to the second position may be the same. This is because an obtained intermediate light distribution pattern differs depending on the third position where the two movable shade bodies 5a and 5b stop and thus, it is necessary to change the lengths of h2 and h4 depending on a desired intermediate light distribution pattern.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A pattern-variable headlamp comprising:

a light source;

a reflector that reflects light from the light source;

a movable shade that switches a position between a first position, a second position, and a third position to form a first light distribution pattern, a second light distribution pattern, and a third light distribution pattern, respectively, from the light reflected from the reflector;

a projection lens that irradiates the first light distribution pattern, the second light distribution pattern and the third light distribution pattern to a road surface;

a first solenoid that moves the movable shade to switch from the first position to the second position;

a second solenoid that moves the movable shade to switch from the first position to the third position; and an elastic returning unit that returns the movable shade to switch from the second position to either of the first position and the third position, or from the third position to the first position.

2. The headlamp according to claim 1, wherein the first solenoid includes a first plunger, the second solenoid includes a second plunger, the movable shade is fixed to the first plunger, and the second plunger is connected to the first plunger via a connecting mechanism.

3. The headlamp according to claim 2, wherein the first solenoid and the second solenoid are disposed side-by-side, a center line of the first plunger and a center line of the second plunger are substantially in parallel, the connecting mechanism includes a connecting plate having one end and other end, and the one end of the connecting plate is fixed to the second plunger, and the other end of the connecting plate abuts against one of end surfaces of a trench formed in the first plunger in a direction of switching of the movable shade, thereby switching the position of the movable shade.

4. The headlamp according to claim 3, wherein when the movable shade is located at the first position, the other end of the connecting plate abuts against the one of the end surfaces of the trench at a direction in which the movable shade is switched from the first position to either of the second position and the third position.

5. The headlamp according to claim 3, wherein at least one of both surfaces of the other end of the connecting plate and both end surfaces of the trench are provided with elastic members.

6. The headlamp according to claim 3, wherein the elastic returning unit is a leaf spring that forms an integral structure with the movable shade, and the leaf spring is disposed not to interfere with the connecting plate.

7. The headlamp according to claim 1, wherein the first solenoid and the second solenoid are pull-type solenoids.

8. The headlamp according to claim 7, wherein when electric current is not applied to the first solenoid and the second solenoid, the first plunger and the second plunger are in a free state, and when electric current is applied to the first solenoid and the second solenoid, the first plunger and the second plunger are pulled into the first solenoid and the second solenoid, respectively.

* * * * *